United States Patent
Oh et al.

(10) Patent No.: US 7,483,472 B2
(45) Date of Patent: Jan. 27, 2009

(54) APPARATUS AND METHOD FOR TRANSMITTING AND RECEIVING DATA IN A CODE DIVISION MULTIPLEXING-FREQUENCY HOPPING-ORTHOGONAL FREQUENCY DIVISION MULTIPLE ACCESS COMMUNICATION SYSTEM

(75) Inventors: Seong Keun Oh, Suwon-si (KR); Ki Bum Kwon, Seongnam-si (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 608 days.

(21) Appl. No.: 11/153,783

(22) Filed: Jun. 15, 2005

(65) Prior Publication Data

US 2005/0281317 A1     Dec. 22, 2005

(30) Foreign Application Priority Data

Jun. 16, 2004 (KR) ..................... 10-2004-0044728

(51) Int. Cl.
*H04B 1/713* (2006.01)
(52) U.S. Cl. ..................... 375/132; 375/222; 375/134; 375/135; 375/146; 375/260
(58) Field of Classification Search ................. 375/132, 375/135, 134, 146, 260, 295, 296
See application file for complete search history.

(56) References Cited

U.S. PATENT DOCUMENTS 7,123,580 B2 * 10/2006 Tang et al. .................. 370/210
7,272,162 B2 * 9/2007 Sano et al. .................. 375/135
7,277,382 B1 * 10/2007 von der Embse ............ 370/209
2004/0066839 A1 * 4/2004 Choi et al. .................. 375/146
2006/0250935 A1 * 11/2006 Hamamoto et al. ......... 370/203

OTHER PUBLICATIONS

Dusan B. Jevtic and Hasan S. Alkhatib, Frequency-Hopping Codes for Mulitple-Access Channels: A Geometric approach, IEEE transactions on information theory, vol. 35, No. 2, Mar. 1989.*
Vijay Nangia and Kevin L. Baum, Experimental Broadband OFDM System, 0-7803-7467-3/02 IEEE 2002.*

* cited by examiner

*Primary Examiner*—Chieh M Fan
*Assistant Examiner*—Siu M Lee
(74) *Attorney, Agent, or Firm*—The Farrell Law Firm, PC (57) ABSTRACT

A system and method for transmitting data by a base station in a multiple access communication system including a plurality of sub-channels, each of which includes a predetermined number of sub-carrier bands, the sub-carrier bands being divided from an entire frequency band. The method includes the steps of: dividing input data streams in a unit of the sub-channels corresponding to each terminal into a plurality of data sequences based on a predetermined length; spreading each of the data sequences by a distinct spread spectrum code, respectively; summing and parallel-converting the spread data; hopping each frequency of the parallel-converted data in the unit of the sub-channels based on a frequency hopping pattern allocated to each of the terminals in advance; performing an inverse fast Fourier transform with respect to the hopped parallel-converted data; and transmitting the transformed data.

10 Claims, 5 Drawing Sheets

APPARATUS AND METHOD FOR TRANSMITTING AND RECEIVING DATA IN A CODE DIVISION MULTIPLEXING-FREQUENCY HOPPING-ORTHOGONAL FREQUENCY DIVISION MULTIPLE ACCESS COMMUNICATION SYSTEM

PRIORITY

This application claims priority under 35 U.S.C. 119(a) to an application entitled "Apparatus And Method For Transmitting/Receiving Data In Code Division Multiplexing-Frequency Hopping-Orthogonal Frequency Division Multiple Access Communication System" filed in the Korean Intellectual Property Office on Jun. 16, 2004 and assigned Serial No. 2004-44728, the contents of which are incorporated herein by reference.

BACKGROUND OF THE INVENTION

1. Field of the Invention

The present invention relates generally to a communication system utilizing a multiple access scheme, and more particularly to an apparatus and method for transmitting and receiving data in a multiple access communication system using a frequency hopping scheme.

2. Description of the Related Art

In the fourth generation (4G) communication system, which is the next generation communication system, research has been actively pursued to provide users with services having various qualities of service (QoS) and supporting a high transmission speeds. Particularly, in the current 4G communication system, research is being actively pursued to develop a new type of communication system capable of providing subscribers with high-speed services by ensuring mobility and QoS to broadband wireless systems, such as a wireless local area network (LAN) system and a wireless metropolitan area network (MAN) system.

Accordingly, many studies are being conducted on an Orthogonal Frequency Division Multiplexing (OFDM) scheme for high-speed data transmission over wired/wireless channels in the 4G communication system. The OFDM scheme, which transmits data using multiple carriers, is a special type of Multicarrier Modulation (MCM) scheme in which a serial symbol sequence is converted into parallel symbol sequences and the parallel symbol sequences are modulated with a plurality of mutually orthogonal sub-carriers before being transmitted.

In order to provide high speed and high quality wireless multimedia services in the 4G communication system, wideband spectrum resources are required. However, the wideband spectrum resources are used, a fading influence on a wireless transmission line becomes serious due to the multipath propagation, and the influence due to frequency selective fading occurs even in a transmission band. Accordingly, for a high speed wireless multimedia service, the OFDM scheme, which is robust against frequency selective fading, has a relatively greater gain. Consequently, the OFDM scheme is being actively utilized in the 4G communication system.

A multiple access scheme based on the OFDM scheme as described above includes an orthogonal frequency division multiple access (OFDMA) scheme, which enables some of the sub-carriers to be allocated to a predetermined terminal. The OFDMA scheme does not require a spreading sequence for band spreading (spread spectrum). However, according to the OFDMA scheme, a sub-channel allocated to a predetermined terminal is fixedly maintained, such that the predetermined terminal may be influenced by continuous fading. Therefore, when the OFDMA scheme is used, it has a problem in that transmission efficiency is deteriorated.

Herein, the sub-channel represents a channel including at least one sub-carrier.

In order to solve such a problem, it is necessary to dynamically change a sub-channel allocated to a predetermined terminal depending on a fading characteristic of a wireless transmission line, thereby increasing a transmission efficiency based on a frequency diversity gain. Herein, dynamically changing sub-channels allocated to a predetermined terminal is called a 'dynamic resource allocation' scheme. A representative dynamic resource allocation scheme is a frequency hopping (FH) scheme.

When a channel of a system utilizing the OFDMA scheme is a quasi-static in which a channel state hardly changes, signals of a predetermined terminal, to which sub-carriers having a low channel gain are allocated, continuously suffer fading. In the following description, it is assumed that a multi-cell is based on the OFDMA scheme, uses a quasi-static channel, and has a frequency reuse factor of '1'.

First, because terminals located in a first cell of the multi-cell receive and use sub-channels different from each other, there is no interference between the terminals. However, terminals located in a cell, e.g., a second cell, adjacent to the first cell may use the same sub-channel as the terminals located in the first cell use, such that signals transmitted and received to and from the terminals located in the second cell may act as interference signals to the terminals located in the first cell. Therefore, when the FH scheme is connected with the OFDMA scheme to be used in a communication system, it is possible to prevent continuous fading and to prevent an interference signal from being received from an adjacent cell.

A scheme in which the FH scheme and the OFDMA scheme are connected with each other is called a frequency hopping orthogonal frequency division multiple access (FH-OFDMA) scheme.

According to the FH-OFDMA scheme, a sub-channel frequency allocated to each of terminals hops by using a predetermined FH code, thereby acquiring the effect obtained by the OFDMA, and also the effect obtained by the FH scheme.

Herein, the FH code may be a Latin-square code. The Latin-squire code is advantageous in that it distinguishes cells in a multi-cell environment and reduces inter-cell interference (ICI).

Figure 1:
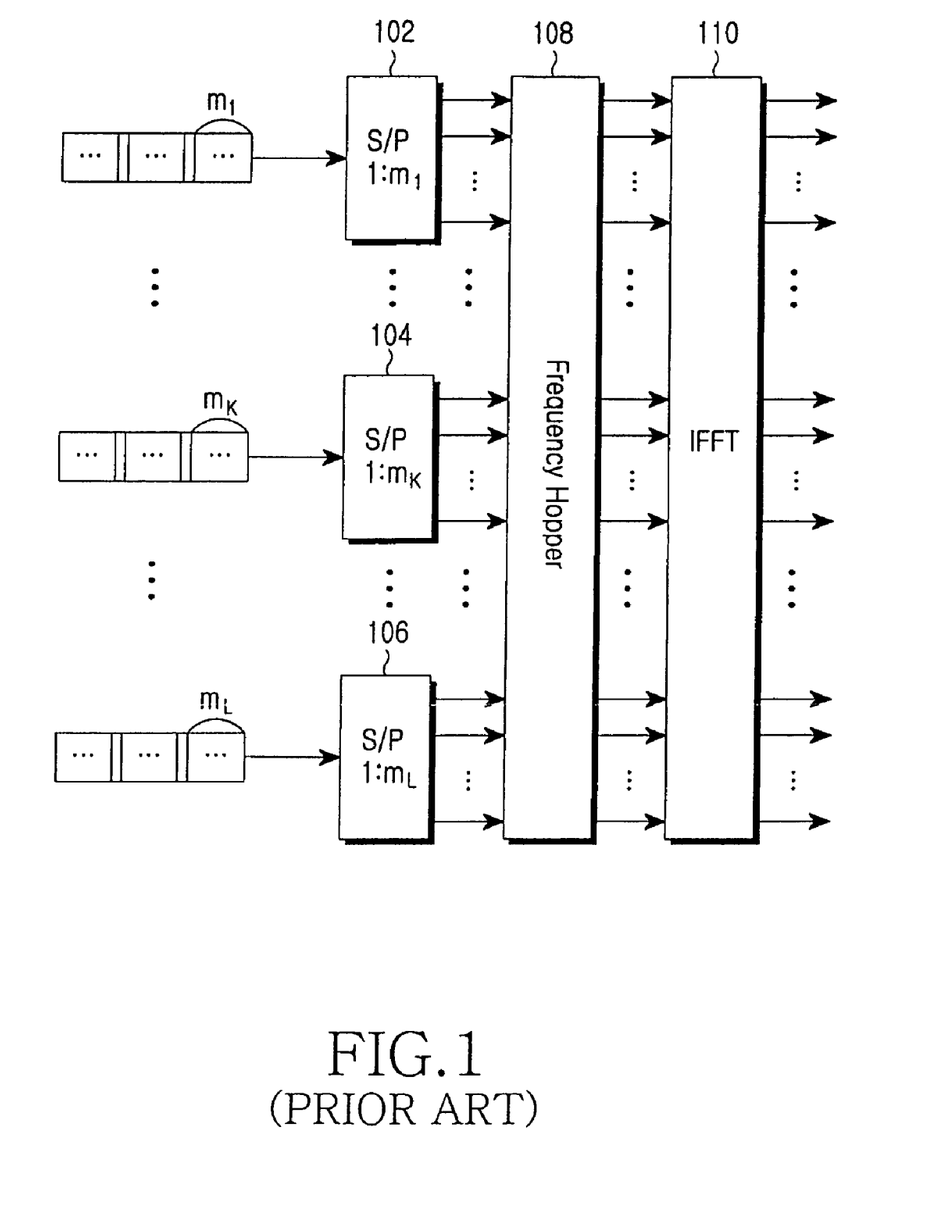
FIG. 1 is a block diagram schematically illustrating a transmission apparatus in a conventional FH-OFDMA communication system.

FIG. 1 is a block diagram schematically illustrating a transmission apparatus in a conventional FH-OFDMA communication system. Referring to FIG. 1, serial-to-parallel converters 102, 104, and 106 receive data streams generated from each terminal, and output a predetermined number of sequences (i.e., the length of a data stream) in parallel. A frequency hopper 108 receives signals output from the serial-to-parallel converters 102, 104, and 106, and dynamically changes sub-carriers of each sub-channel according to a predetermined frequency hopping pattern. Thereafter, an inverse fast Fourier transform (IFFT) unit 110 receives each of signals output from the frequency hopper 108, performs an inverse Fourier transform on the received signal from a frequency domain to a time domain, and outputs the transformed signal. The signal transformed to the time domain by the IFFT unit 110 is shifted to a signal of a radio frequency band through a normal OFDM transmission procedure, and is then transmitted.

The Latin-square code is the best-known FH code for the FH-OFDMA system. According to the Latin-square codes, each FH code set has a distinct slope, and a distinct FH code set is allocated to each cell. Therefore, a base station can differentiate cells by detecting the slopes of the FH codes.

A Latin-square code matrix includes a set of n codes, each of which has a length of 'n'. Each of the n codes includes the numerals of '0' to 'n−1' as its components. Every row and every column have all the numerals of '0' to 'n−1' just once. When the 'n' is a prime number, an n×n Latin-square code matrix {a} may be expressed as shown in Equation (1).

$$\{a\}_{ij} = ai+j \pmod{n} \quad (1)$$

In Equation (1), 'i' and 'j' are parameters representing a row and a column of matrix {a}, respectively, and are used as a frequency index and a time index, respectively, when a frequency is hopped.

To generate the Latin-square code a first row is generated by arranging the numerals of '0' to 'n−1' in sequence. A second row is generated by cyclically shifting the numerals of '0' to 'n−1' by 'a' from the their positions in the first row. A third row is generated by cyclically shifting the numerals of '0' to 'n−1' by 'a' from their positions in the second row. Thereafter, the remaining rows can be generated by performing the above-mentioned process in sequence.

'n−1' number of Latin-square code sets that differ from each other can be generated by varying the value of 'a' from 1 to 'n−1'. Herein, the 'a' represents a distinct slope of the Latin-square code sets. In the code matrix generated as described above, each column corresponds to an FH code. Therefore, each terminal is allocated with a distinct column of the code matrix, and performs frequency hopping to a frequency corresponding to a numeral included in the column at every period.

Although the FH-OFDMA scheme is used, the shortage of radio resources, a basic problem in a wireless communication, is not solved. That is, in order to accommodate more terminals and simultaneously perform high-speed and large quantity data transmission, it is necessary to research and develop a superior multiple access scheme. Accordingly, it is necessary to develop a new multiple access scheme, which can solve the resource shortage problem, maximize frequency diversity gain, and transmit a large quantity of data at high speed.

SUMMARY OF THE INVENTION

Although the FH-OFDMA scheme is used, the shortage of radio resources, a basic problem in a wireless communication, is not solved. That is, in order to accommodate more terminals and simultaneously perform high-speed and large quantity data transmission, it is necessary to research and develop a superior multiple access scheme. Accordingly, it is necessary to develop a new multiple access scheme, which can solve the resource shortage problem, maximize frequency diversity gain, and transmit a large quantity of data at high speed.

Accordingly, the present invention has been designed to solve the above and other problems occurring in the prior art. An object of the present invention is to provide an apparatus and method for transmitting a large quantity of data at high speed.

Another object of the present invention is to provide an apparatus and method for efficiently using radio resources.

Still another object of the present invention is to provide an apparatus and method for maximizing a frequency diversity gain.

To accomplish the above and other objects, in accordance with an aspect of the present invention, there is provided a method for transmitting data by a base station in a multiple access communication system including a plurality of sub-channels, each of which having a predetermined number of sub-carrier bands, the sub-carrier bands being divided from an entire frequency band. The method includes the steps of: dividing input data streams in a unit of the sub-channel corresponding to each terminal into a plurality of data sequences based on a predetermined length; spreading each of the divided data sequences by a distinct spread spectrum code, respectively; summing and parallel-converting the spread data sequences; hopping each frequency of the parallel-converted data in the unit of the sub-channels based on a frequency hopping pattern allocated to each of the terminals in advance; performing an inverse fast Fourier transform with respect to the hopped parallel-converted data; and transmitting the transformed data.

In accordance with another aspect of the present invention, there is provided an apparatus for transmitting data by a base station in a multiple access communication system including a plurality of sub-channels, each of which includes a predetermined number of sub-carrier bands, the sub-carrier bands being divided from an entire frequency band. The apparatus includes: a first serial-to-parallel converter for dividing data streams input in a unit of the sub-channel corresponding to each terminal into a plurality of data sequences based on a predetermined length; a band spreader for spreading each of the data sequences by a distinct spread spectrum code, respectively; a summer for summing data output from the band spreader; a second serial-to-parallel converter for parallel-converting the summed data; a frequency hopper for performing frequency hopping in the unit of the sub-channels based on a frequency hopping pattern allocated to each of the terminals in advance; and an inverse fast Fourier transform unit for performing an inverse fast Fourier transform with respect to data output from the frequency hopper and transmitting the transformed data.

In accordance with still another aspect of the present invention, there is provided a method for transmitting data by a terminal in a multiple access communication system including sub-channels, each of which includes a predetermined number of sub-carrier bands, the sub-carrier bands being divided from an entire frequency band. The method includes the steps of: dividing input data streams into a plurality of data sequences having a predetermined length; spreading each of the data sequences by a distinct spread spectrum code, respectively; summing and parallel-converting the spread data; hopping each frequency of the parallel-converted data in a unit of the sub-channel based on a frequency hopping pattern allocated to each of the terminals in advance; performing an inverse fast Fourier transform with respect to hopped parallel-converted data; and transmitting the transformed data.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description of the embodiments of the present invention, a detailed description of known functions and configurations incorporated herein will be omitted when it may obscure the subject matter of the present invention.

More specifically, in the present invention, a multiple access scheme according to high-speed/large quantity data transmission, maximization of frequency diversity, and efficient radio resource utilization targeted by the next generation mobile communication system will be described.

Generally, in the Orthogonal Frequency Division Multiplexing (OFDM) scheme, because spectrums between sub-carriers, i.e., sub-carrier channels, maintain a mutual orthogonality and are overlapped with each other, spectrum efficiency is good. Further, in the OFDM scheme, modulation is achieved by an inverse fast Fourier transform (IFFT) and demodulation is achieved by a fast Fourier transform (FFT). A multiple access scheme based on the OFDM scheme as described above includes an Orthogonal Frequency Division Multiple Access (OFDMA) scheme, which enables some of the sub-carriers to be allocated to a predetermined terminal and the allocated sub-carriers to be used.

The OFDMA scheme does not require a spreading sequence for band spreading and can dynamically change a set of sub-carriers, which are allocated to a predetermined terminal, according to a fading characteristic of a wireless transmission line. Herein, dynamically changing a set of sub-carriers allocated to a predetermined terminal is called a dynamic resource allocation scheme, and the dynamic resource allocation scheme includes a frequency hopping (FH) scheme, etc.

Conversely, a multiple access scheme requiring a spreading sequence may be classified into a spreading scheme in a time domain and a spreading scheme in a frequency domain. According to the spreading scheme in the time domain, a terminal signal, i.e., a user signal, is band-spread in the time domain and then the band-spread signal is mapped to a sub-carrier. According to the spreading scheme in the frequency domain, a user signal is demultiplexed in a time domain to be mapped to a sub-carrier, and the user signal is differentiated in the frequency domain by using an orthogonal sequence.

A multiple access scheme proposed by the present invention has the characteristics of the multiple access scheme based on the OFDMA scheme and also is robust against frequency selective fading through the characteristics of a Code Division Multiple Access (CDMA) scheme and the FH scheme. In the present invention, the multiple access scheme newly proposed is called a Code Division Multiplexing-Frequency Hopping-Orthogonal Frequency Division Multiple Access (CDM-FH-OFDMA).

In the present invention, in order to increase a frequency diversity gain and to efficiently utilize radio resources, when the number of sub-carriers allocated to each of terminals according to the amount of information is larger than a predetermined reference number, each of the terminals is individually grouped as a user group. That is, each of the terminals is set as one group by the CDM group so as to band-spread each sequence of data streams by a distinct CDM code. Herein, the predetermined reference number is determined when the system is designed.

However, when the number of sub-carriers allocated to each of terminals is equal to or smaller than the predetermined reference number, all sub-carriers occupied by the terminals are determined as one CDM group to band-spread each of the sub-carriers. That is, all of the sub-carrier bands are set as one CDM group.

Further, it is necessary that the length of a CDM code according to CDM groups varies depending on the number of sub-carriers (the number of FH codes) contained in a relevant group. Therefore, the present invention uses a Discrete Fourier Transform (DFT) sequence, which can variably establish the length of a CDM code, as a CDM orthogonal code. The CDM code based on the DFT sequence will be described herein below.

Generally, the CDM code uses an orthogonal code in order to minimize inter-code interference. As an orthogonal code used to multiplex the CDM code, the Walsh code may be best for data having a length of $2^n$ ('n' is an integer), but it is rare for all of $2^n$ sub-carriers to be used for transmission in an actual OFDM system. Also, in a CDM-FH-OFDMA system according to an embodiment of the present invention, when multiple terminals are bound to groups, the lengths of codes to be allocated to the groups may differ. Accordingly, because the CDM code having different lengths of orthogonal codes must be used, it is necessary that the length of the orthogonal code can be variably set. Therefore, in the present invention, a DFT code as expressed in Equation (2) is used as a CDM code.

$$O_{n+1}^{(K)} = \left[1, e^{\frac{j2\pi \cdot n}{K}}, e^{\frac{j4\pi \cdot n}{K}}, \ldots, e^{\frac{j2\pi \cdot n \cdot (M-1)}{K}}\right], \quad (2)$$

$$(n = 0, 1, \ldots, K-1)$$

In Equation (2), $$O_{n+1}^{(K)}$$

represents an $(n+1)^{th}$ orthogonal code having a length of 'K'.

Figure 2:
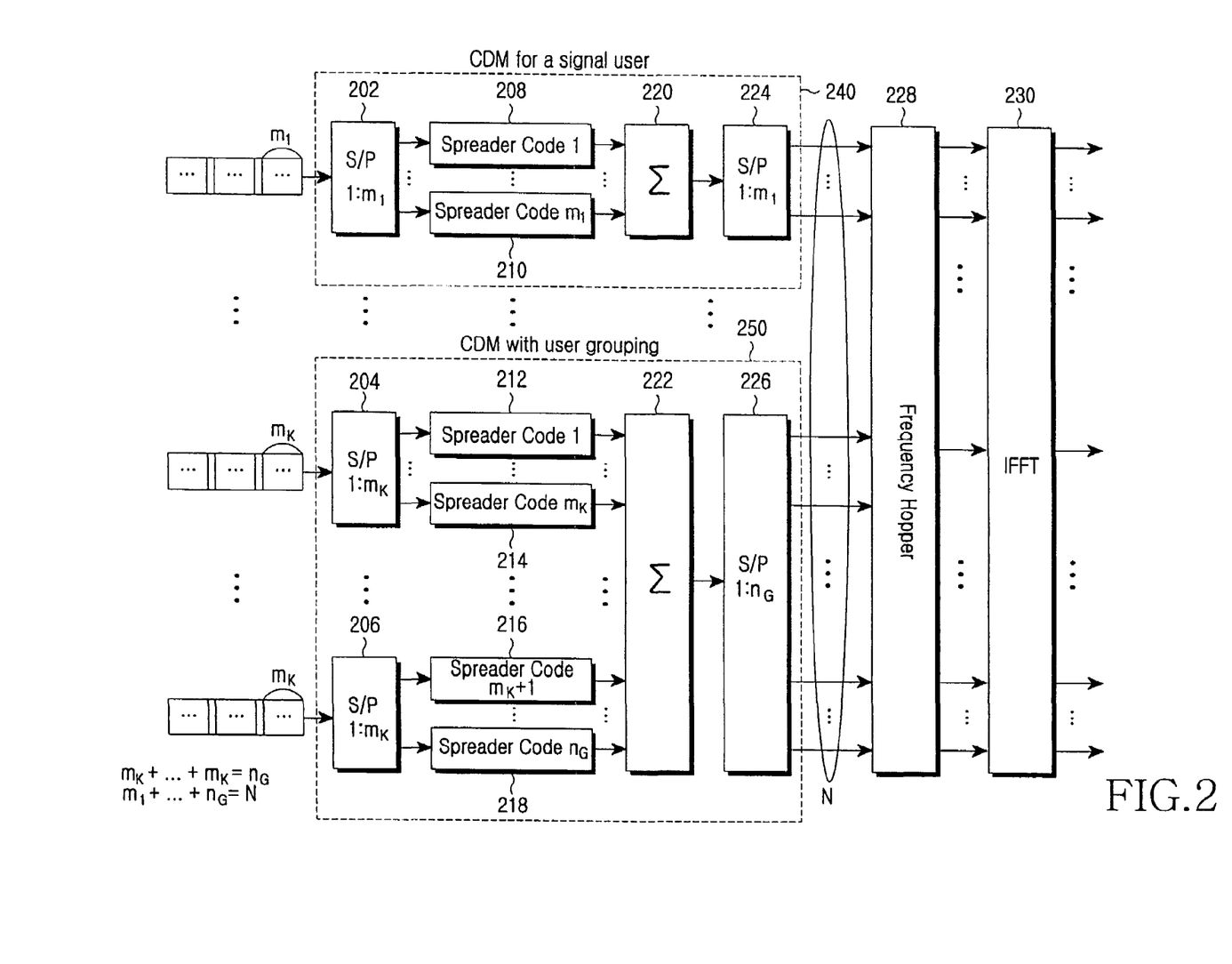
FIG. 2 is a block diagram schematically illustrating a forward transmission apparatus in a communication system utilizing the CDM-FH-OFDMA scheme according to an embodiment of the present invention.

FIG. 2 is a block diagram schematically illustrating a forward transmission apparatus in a communication system utilizing the CDM-FH-OFDMA scheme according to an embodiment of the present invention. Referring to FIG. 2, during a forward transmission, terminals requesting high-speed transmission, i.e., terminals to each of which many sub-carriers are allocated, and terminals requesting low-speed transmission, i.e., terminals to each of which a few sub-carriers are allocated, may exist. In this case, as described above, when the number of sub-carriers allocated to a terminal is larger than a predetermined reference number, a control unit (not shown) sets the single terminal as one CDM group 240. However, when the number of sub-carriers allocated to each of terminals is equal to or smaller than the predetermined reference number, the control unit sets the terminals as one CDM group 250. Herein, when the terminals use different modulation and demodulation schemes or coding and decoding schemes from each other, it is preferred that terminals having an equal characteristic as much as possible are bound to one group.

A CDM processing procedure for data of the CDM group 240 for a single terminal will now be described. A serial-to-parallel converter 202 receives a data stream having a length of '$m_1$', converts the received data stream into branch sequences corresponding to length '$m_1$' of the data stream, and then outputs the branch sequences in parallel. A band spreader 208 receives a first sequence of the entire sequences of the parallel-converted data streams, and band-spreads the first sequence by multiplying the first sequence by a first DFT code.

A band spreader 210 receives a last $m_1$ sequence of the sequences of the parallel-converted data streams, and band-spreads the $m_1$ sequence by multiplying the $m_1$ sequence by a last DFT code ($m_1^{th}$ DFT code). Herein, the received sequences are band-spread by different orthogonal sequences as described above in order to prevent interference between the received sequences.

'$m_1$' number of band-spread signals output from the band spreaders 208 to 210 are input to a summer 220. The summer 220 sums the spread signals and outputs a single spread signal sequence. The single spread signal sequence output from the summer 220 is input to a serial-to-parallel converter 224. The serial-to-parallel converter 224 receives the spread signal sequence, again converts the received sequence into '$m_1$' number of parallel signals, and then outputs the '$m_1$' number of parallel signals to a frequency hopper 228.

The frequency hopper 228 hops each frequency of the input signals based on a frequency hopping pattern generated by a frequency hopping pattern generator (not shown), and then outputs frequency-hopped signals to the IFFT 230. Herein, the frequency hopping pattern generator may be either included in the frequency hopper or separately constructed.

Now, a CDM processing procedure for data of the CDM group 250 set to include a plurality of terminals will be described. More specifically, a plurality of terminals to each of which a few sub-carriers are allocated, i.e., from each of which a data stream of a short length is generated, form the CDM group 250. For the convenience of the description, it is assumed that the terminals have a data stream of an equal length of '$m_k$'.

A serial-to-parallel converter 204 receives a data stream having a length of '$m_k$', converts the received data stream into $m_k$ sequences corresponding to length of the data stream, and then outputs the sequences in parallel. A serial-to-parallel converter 206 receives a data stream having a length of '$m_k$', converts the received data stream into $m_k$ sequences corresponding to length of the data stream, and then outputs the sequences in parallel. Each of band spreaders 212, 214, 216, and 218 receives a relevant one of the parallel-converted sequences, band-spreads the received sequence by multiplying the received sequence by a distinct DFT code, and then outputs the band-spread sequence to a summer 222.

The summer 222 receives and sums the band-spread signals, and outputs a single sequence to a serial-to-parallel converter 226. The serial-to-parallel converter 226 receives the single sequence, again converts the received sequence into parallel sequences corresponding to the entire length of the data stream, and then outputs the parallel sequences to the frequency hopper 228. The frequency hopper 228 receives the sequences output from the CDM group 240 for a single terminal and the sequences output from the CDM group 250 for multiple terminals according to groups, hops each frequency of the received sequences based on a frequency hopping pattern, and then outputs frequency-hopped signals to the IFFT 230. The IFFT 230 receives the frequency-hopped signals, performs an inverse fast Fourier transform with respect to the received signals, and then outputs the transformed signals.

Figure 3:
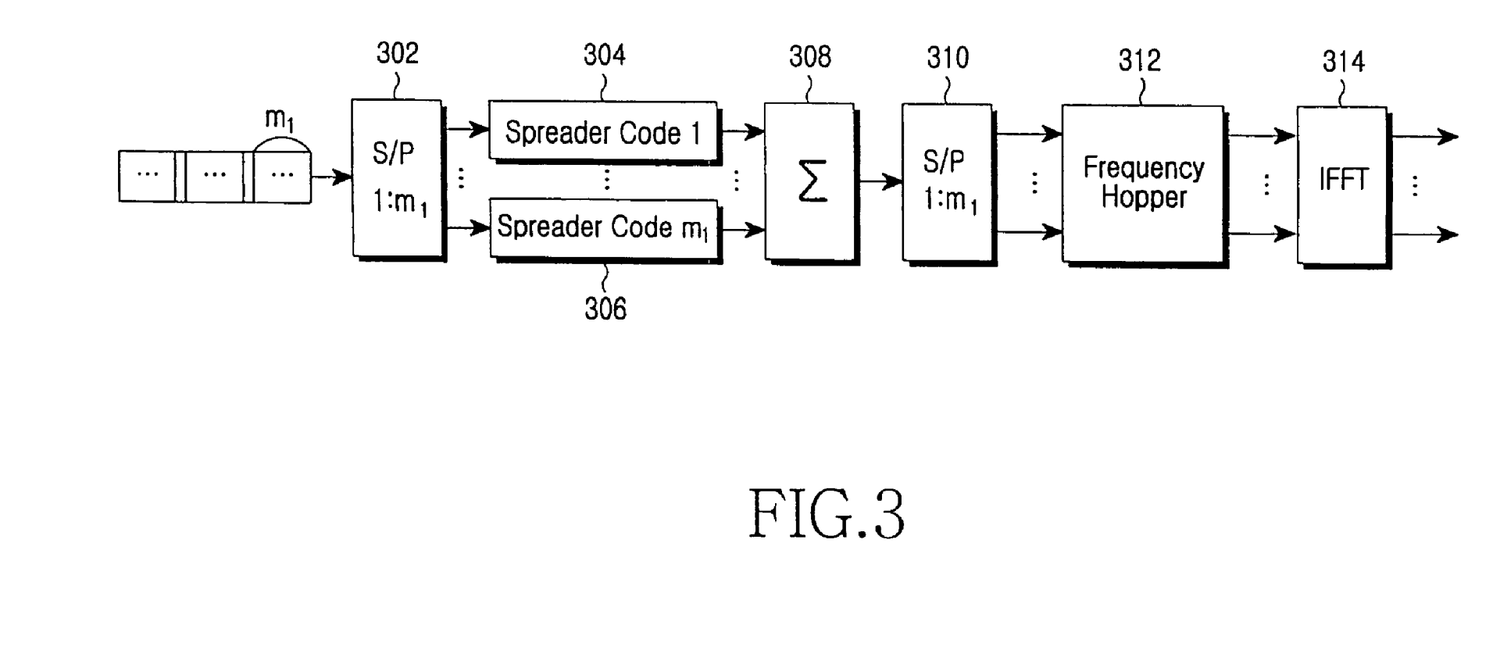
FIG. 3 is a block diagram schematically illustrating a backward transmission apparatus in a communication system employing the CDM-FH-OFDMA scheme according to an embodiment of the present invention.

FIG. 3 is a block diagram schematically illustrating a backward transmission apparatus in a communication system utilizing the CDM-FH-OFDMA scheme according to an embodiment of the present invention. Referring to FIG. 3, a serial-to-parallel converter 302 receives a data stream having a length of '$m_1$', converts the received data stream into sequences corresponding to length '$m_1$' of the data stream, and then outputs the sequences in parallel. A band spreader 304 receives a first sequence of the entire sequences of the parallel-converted data streams, and band-spreads the first sequence by multiplying the first sequence by a first DFT code.

A band spreader 306 receives a last $m_1$ sequence of the entire sequences of the parallel-converted data streams, and band-spreads the $m_1$ sequence by multiplying the $m_1$ sequence by a last DFT code ($m_1^{th}$ DFT code). Herein, the received sequences are band-spread by different orthogonal sequences as described above in order to prevent interference between the received sequences. '$m_1$' number of band-spread signals output from the band spreaders 304 to 306 are input to a summer 308.

The summer 308 sums the spread signals and outputs a single spread signal sequence. The single spread signal sequence output from the summer 308 is input to a serial-to-parallel converter 310. The serial-to-parallel converter 310 receives the spread signal sequence, again converts the received sequence into '$m_1$' number of parallel signals, and then outputs the '$m_1$' number of parallel signals to a frequency hopper 312. The frequency hopper 312 hops each frequency of the input signals based on a frequency hopping pattern generated by a frequency hopping pattern generator (not shown), and then outputs frequency-hopped signals to the IFFT 314.

Figure 4:
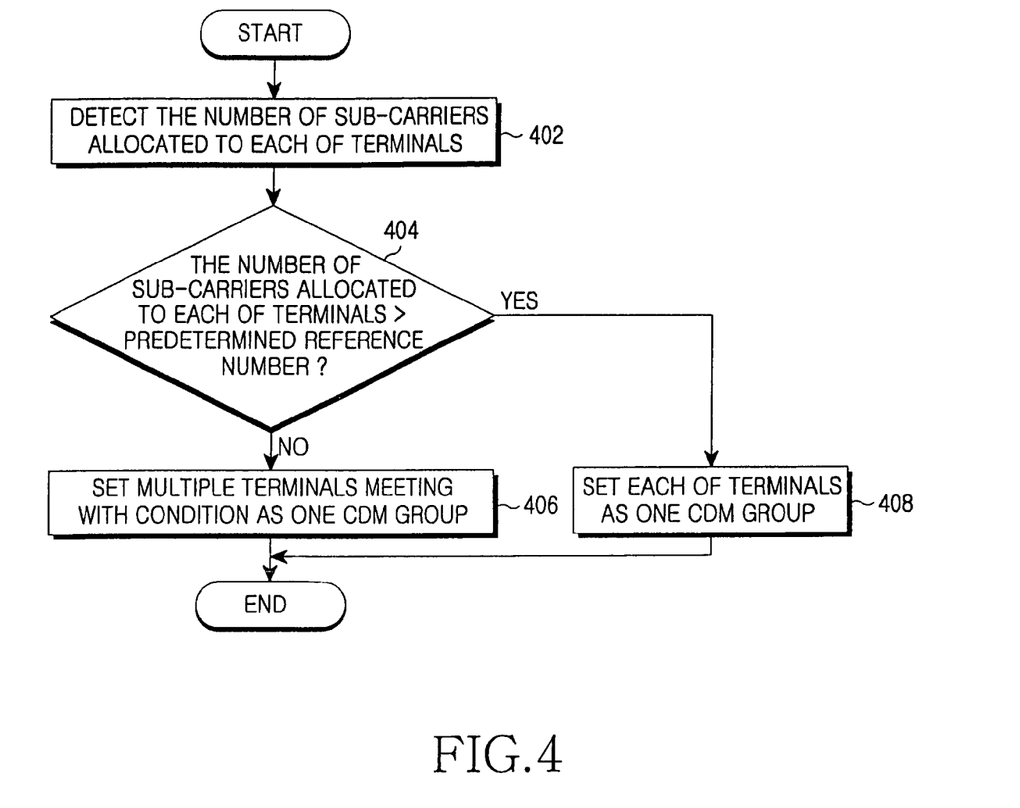
FIG. 4 is a flowchart illustrating a CDM group setting procedure performed by a control unit of a forward transmission apparatus in a communication system utilizing the CDM-FH-OFDMA scheme according to an embodiment of the present invention.

FIG. 4 is a flowchart illustrating a CDM group setting procedure performed by a control unit of a forward transmission apparatus in a communication system utilizing the CDM-FH-OFDMA scheme according to an embodiment of the present invention. Referring to FIG. 4, the control unit detects the number of sub-carriers allocated to each of the terminals in step 402. In step 404, the control unit determines if the number of subcarriers allocated to each of the terminals is larger than a predetermined reference number with respect to each of the terminals. When the number of allocated sub-carriers is larger than the predetermined reference number, the control unit proceeds to step 408, and when the number of allocated subcarriers is smaller than or equal to the predetermined reference number, the control unit proceeds to step 406.

In step 406, the control unit sets the multiple terminals as one CDM group, when the number of subcarriers allocated to each of the terminals is smaller than or equal to the predetermined reference number. In this case, it is preferred that the control unit binds terminals having an equal characteristic as much as possible to form one CDM group, when the terminals use different modulation and demodulation schemes or coding and decoding schemes from each other.

In step 408, the control unit sets each of the terminals as one CDM group, when the number of subcarriers allocated to each of the terminals is larger than the predetermined reference number.

Figure 5:
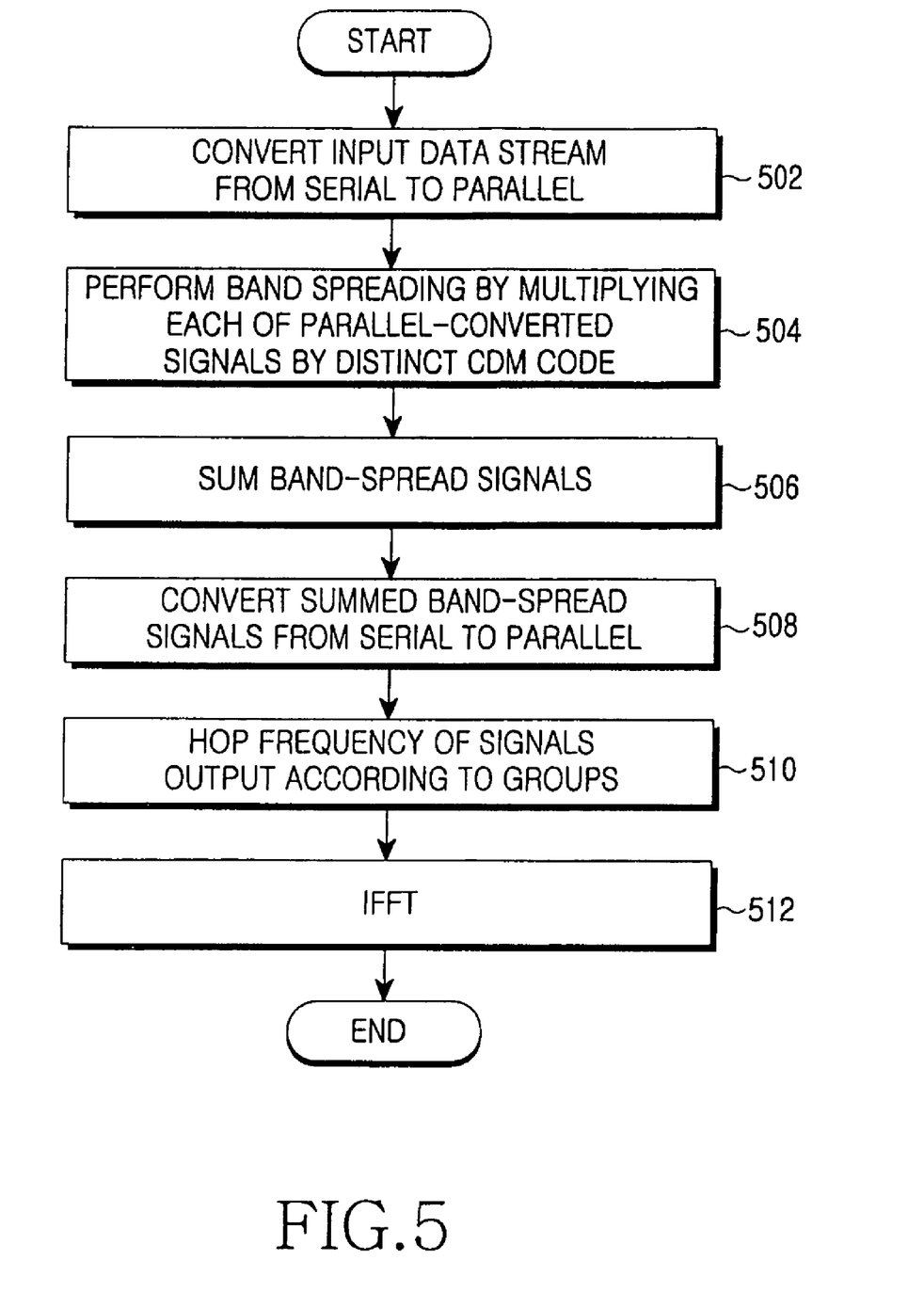
FIG. 5 is a flowchart illustrating a data transmission procedure in a communication system utilizing the CDM-FH-OFDMA scheme according to an embodiment of the present invention.

FIG. 5 is a flowchart illustrating a data transmission procedure in a communication system utilizing the CDM-FH-OFDMA scheme according to an embodiment of the present invention. Referring to FIG. 5, in step 502, a first serial-to-parallel converter parallel-converts an input data stream into a plurality of branch sequences based on the length of the input data stream. In step 504, a band spreader band-spreads the parallel-converted signals by multiplying each of the parallel-converted signals by a distinct CDM code. In step 506, a summer sums the band-spread signals.

In step 508, a second serial-to-parallel converter converts the summed band-spread signal from a serial signal to parallel signals. In step 510, a frequency hopper receives serial-to-parallel converted signals from each of predetermined groups, and hops each frequency of the received signals according to a frequency hopping pattern. In step 512, an IFFT performs an inverse fast Fourier transform with respect to the frequency-hopped signals, and outputs the transformed signals.

As described above, according to the present invention, because the CDM technique is associated with the existing FH-OFDMA technique, high-speed and large-quantity data transmission can be efficiently performed. Also, because the DFT code is used as a spread spectrum code, it is possible to process data streams having different lengths without wasting resources.

In addition, the apparatus and the method according to the present invention has an advantage in that a frequency diversity gain can be maximized.

While the present invention has been shown and described with reference to certain preferred embodiments thereof, it will be understood by those skilled in the art that various changes in form and details may be made therein without departing from the spirit and scope of the present invention as defined by the appended claims. Accordingly, the scope of the invention is not to be limited by the embodiments described above, but by the following claims and the equivalents thereof.

What is claimed is:

1. A method for transmitting data by a base station in a multiple access communication system including a plurality of sub-channels, each of which including a predetermined number of sub-carrier bands, the sub-carrier bands being divided from an entire frequency band, the method comprising the steps of:

grouping terminals according to the number of sub-carriers allocated to each of a plurality of terminals; wherein each group has at least one terminal;

dividing input data streams in a unit of the sub-channels corresponding to each of the grouped terminals into a plurality of data sequences based on a predetermined length;

spreading each of the data sequences by a distinct spread spectrum code within each group, respectively;

summing and parallel-converting the spread data;

hopping each frequency of the parallel-converted data in the unit of the sub-channels based on a frequency hopping pattern allocated to each of the terminals in advance;

performing an inverse fast Fourier transform with respect to the hopped parallel-converted data; and transmitting the transformed data.

2. The method as claimed in claim 1, wherein the spread spectrum code is a Discrete Fourier Transform (DFT) code.

3. The method as claimed in claim 1, wherein terminals having a number of allocated subcarriers smaller than or equal to a predetermined reference number are grouped as one group.

4. The method as claimed in claim 1, wherein each of the terminals having a number of allocated subcarriers larger than a predetermined reference number is grouped as one group.

5. The method as claimed in claim 1, wherein the frequency hopping is performed by using a Latin-square code.

6. An apparatus for transmitting data by a base station in a multiple access communication system including a plurality of sub-channels, each of which includes a predetermined number of sub-carrier bands, the sub-carrier bands being divided from an entire frequency band, the apparatus comprising:

a control unit for grouping terminals according to the number of sub-carriers allocated to each of a plurality of terminals; wherein each group has at least one terminal;

a first serial-to-parallel converter for dividing data streams input in a unit of the sub-channels corresponding to each of the grouped terminals into a plurality of data sequences based on a predetermined length;

a band spreader for spreading each of the data sequences by a distinct spread spectrum code within each group, respectively;

a summer for summing data output from the band spreader;

a second serial-to-parallel converter for parallel-converting the summed data;

a frequency hopper for performing frequency hopping in the unit of the sub-channels based on a frequency hopping pattern allocated to each of the terminals in advance; and an inverse fast Fourier transform unit for performing an inverse fast Fourier transform with respect to data output from the frequency hopper and transmitting the transformed data.

7. The apparatus as claimed in claim 6, wherein the band spreader performs spread spectrum by means of a Discrete Fourier Transform code.

8. The apparatus as claimed in claim 7, further comprising a control unit for grouping spread spectrum of data streams of the terminals in consideration of a number of sub-carriers allocated to each of the terminals and a predetermined reference number.

9. The apparatus as claimed in claim 8, wherein the control unit groups terminals having a number of allocated subcarriers smaller than or equal to a predetermined reference number as one group.

10. The apparatus as claimed in claim 8, wherein the control unit groups each of the terminals having a number of allocated subcarriers larger than a predetermined reference number as one group.

* * * * *